Patented Feb. 2, 1954

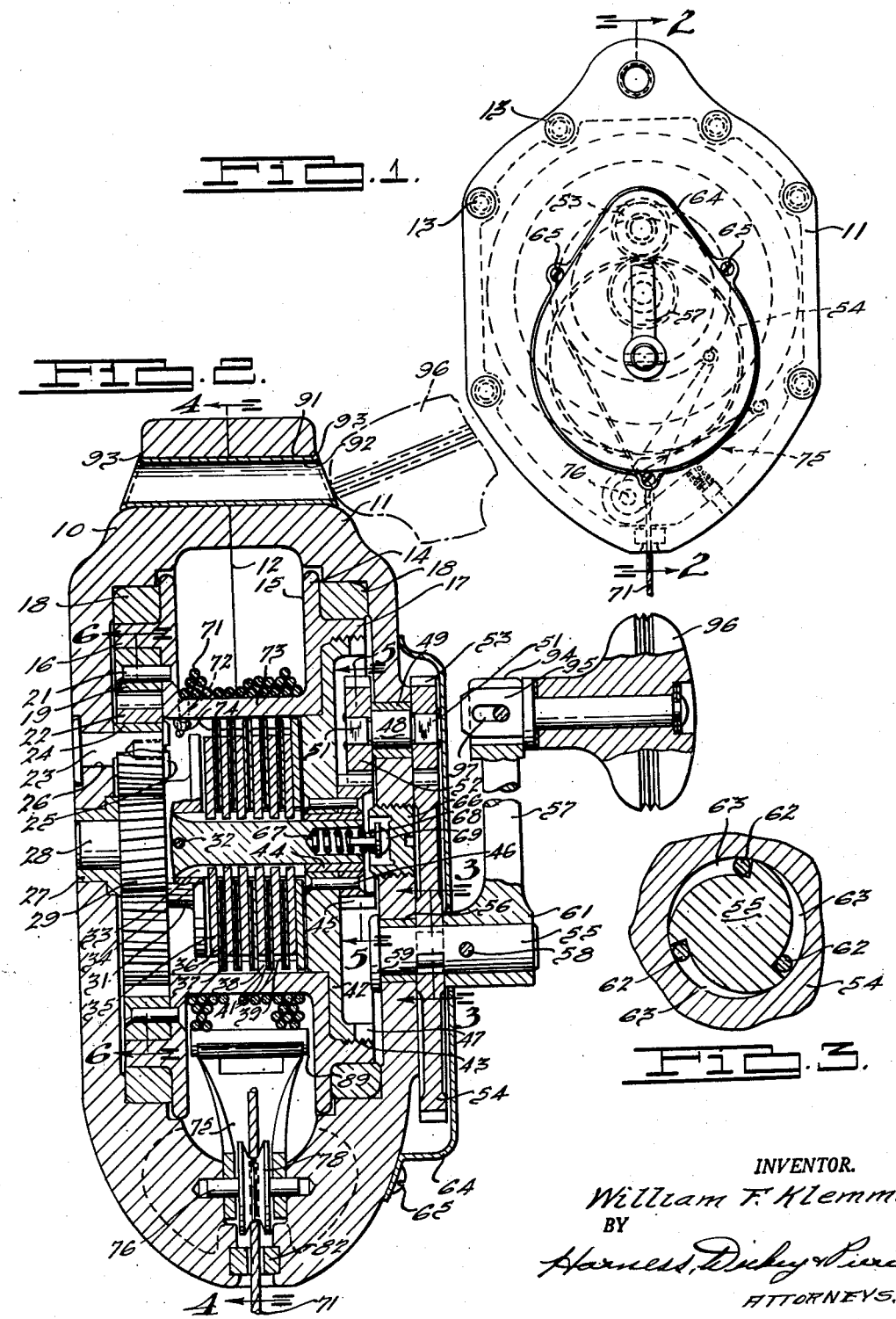

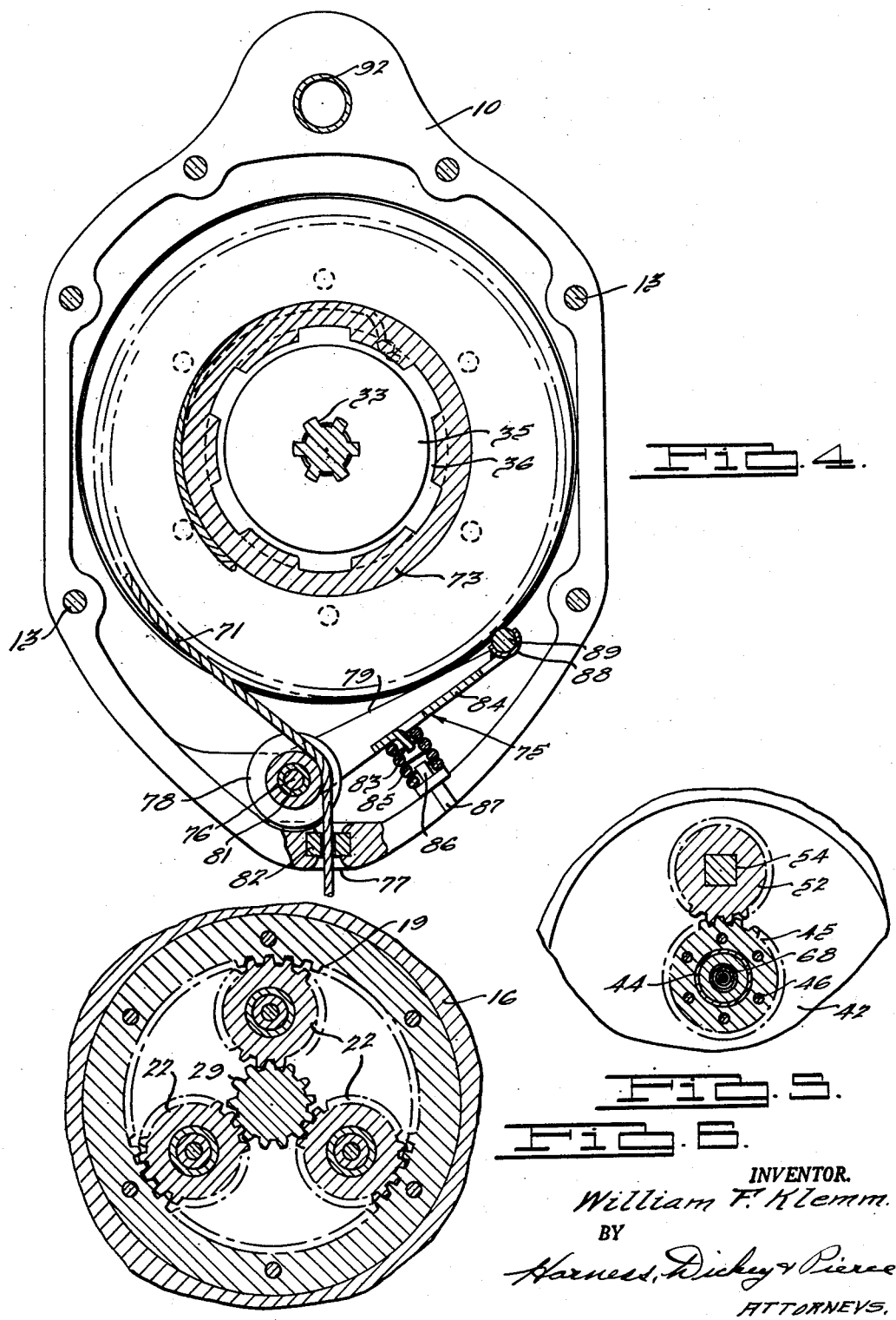

2,668,036

UNITED STATES PATENT OFFICE 2,668,036

CABLE AND REEL FOR LOWERING OBJECTS OF DIFFERENT WEIGHT AT CONSTANT SPEED

William F. Klemm, Detroit, Mich.

Application March 14, 1950, Serial No. 149,573

19 Claims. (Cl. 254—186)

This invention relates to safety devices, and particularly to a device which safely lowers a load from a height to a lower level.

The safety device of the present invention pertains to a housing having a reel containing a light, strong cable of substantial length which is wound thereon. The unwinding of the cable is controlled by a clutch mechanism which applies increased pressure on the clutch plates as loads of increased weight are lowered. The clutch embodies a plurality of plates, alternate ones of which are secured to the reel, the interjacent ones being secured to a shaft having a helical gear mated with helical planetary gears which are in engagement with an internal gear secured to the reel. The helical angle of the gear teeth is such as to provide a thrust axially of the shaft to move the plates into more intimate engagement with each other with a force depending upon the weight of a load being lowered. Less force results between the mating faces of the clutch plates when a light load is being lowered, while a greater force is applied to the plates when a heavier load is lowered. As a result, the rate of lowering a load is maintained at a desirable constant speed.

A handle mechanism is provided for rewinding the cable on the drum after a lowering operation. A spring finger maintains a roller in engagement with the cable being wound on the drum which guides the cable into layers so that all of the cable may be wound upon the drum each time a rewinding operation is undertaken.

Accordingly, the main objects of the invention are: to provide a safety device for lowering loads, the speed of lowering being maintained constant and independent of the load weight; to provide a safety load lowering device with a drum containing a substantial length of cable, the paying out of which is controlled by a clutch made up of engaging plates which provide frictional resistance against drum rotation which is varied by the end thrust produced by helical teeth of a gear on a shaft which thereby applies pressure between the engaging faces of the plates which varies with the load; to provide a rewind mechanism with an overrunning clutch which is inoperative when a load is lowered but which becomes effective when a crank is operated for rewinding the cable on the drum; to provide a shaft for supporting one set of friction plates of the clutch with a gear having teeth of predetermined helix angle for applying a thrust longitudinally of the shaft against a spring, the tension of which may be changed by changing the spring and also by a threaded cap which regulates the load thereon to thereby calibrate the amount of resistance produced in the device for the load being lowered; to provide a spring-pressed finger with a roller which extends within the drum for engaging the cable which is wound thereon for winding the cable in rows and for retaining the cable tightly wound upon the drum, and, in general to provide a compact safety load lowering device which is simple of construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a side view in elevation of a safety device embodying features of the present invention;

Fig. 2 is an enlarged sectional view of the structure illustrated in Fig. 1, taken on the line 2—2 thereof;

Fig. 3 is an enlarged sectional view of the structure illustrated in Fig. 2, taken on the line 3—3 thereof;

Fig. 4 is a sectional view of the structure illustrated in Fig. 2, taken on the line 4—4 thereof;

Fig. 5 is a broken sectional view of the structure illustrated in Fig. 2, taken on the line 5—5 thereof, and Fig. 6 is a sectional view of the structure illustrated in Fig. 2, taken on the line 6—6 thereof.

The safety device of the present invention comprises a housing made up of two side castings 10 and 11 which are joined along a medial line 12 and secured together by a plurality of through bolts 13. The housing supports a drum 14 having a central reel cavity 15 and annular outwardly projecting flanges 16 and 17. Annular bearing elements 18, of oil-absorbing sintered metal of bronze or other alloy, are press-fitted within the castings 10 and 11, the inner faces of which are engaged by the outer faces of the flanges 16 and 17 of the drum for supporting the drum for rotational movement. Against the internal surface of the flange 16, an internal gear 19 is press-fitted and secured by a plurality of screws or rivets 21 in fixed relation to the drum. A plurality of planetary gears 22, herein illustrated as three in number, are mounted on headed pins 23 on sleeve bearings 24 which are secured in position by an enlarged headed screw 25. Pins 23 extend through apertures 26 disposed 120° apart. Centrally of the pins 23, a shouldered sleeve bearing 27 is mounted in the casting 10 for supporting one end of a shaft 28 on which a pinion gear 29 is secured, the teeth of which are disposed in mesh with the teeth of the planetary gears 22. The teeth of the pinion gear 29, the planetary gears 22 and the internal gear 19 are of the helical type, being disposed at an angle of approximately 24° for a purpose which will be hereinafter explained. The shaft 28 on the opposite side of the gear 29 from the bearing 27 has a pressure-applying plate 31 secured thereto by a pin 32. The shaft has a plurality of spline grooves 33 for receiving the spaced splines or fingers 34 which extend inwardly from a central aperture in a plurality of clutch plates 35. Disposed between the plates 35 are a plurality of plates 36 which have on the outer periphery a plurality of splines or fingers 37 which extend within spline grooves 38. In this relationship, the plates 35 are secured to the shaft 28, while the plates 36 disposed therebetween are secured to the drum 14. The plates 36 are of the bimetallic type, having a central portion 39 of soft steel and having on each face thereof a layer of oil-absorbing sintered metal or similar alloy 41 to provide a bearing. The plates 35 may be of steel alloy similar to the core of the plates 36. The engagement of the faces of the plates 35 with the bearing surfaces of the plates 36 provides desired frictional relation to resist rotation of the drum without any danger of scoring and thereby provides a constant frictional resistance to the rotation of the drum 14 when a load is applied thereto.

A cap plate 42 is threaded into the internally threaded surface 43 of the annular flange 17 on the drum 14, having a central sleeve 44 which provides a bearing for the shaft 28. A gear 45 is secured to the plate on the outside of the bearing 44 by screws or rivets 46. Spanner recesses 47 are provided in the plate 42 by which it is screwed into position or removed from the drum. A shaft 48 is mounted in a bearing sleeve 49 in the housing portion 11, each end of the shaft having a square head 51. A gear 52 is mounted on the inner head 51 of the shaft 48 in mesh with teeth of the gear 45. A gear 53 is mounted on the square head 51 externally of the housing, disposed in mesh with a gear 54 mounted on the shaft 55 which is journaled in the housing portion 11 on a sleeve bearing 56. The square ends of the shaft are peened over the gears to secure the gears on the shaft ends.

An operating crank 57 is secured to the protruding end of the shaft 55 by a pin 58. The shaft 55 is provided with an enlarged head 59 on its inner end and is thereby retained against outward movement and is prevented from moving inwardly by the boss 61 of the crank arm 57. The gear 54 is free to rotate in one direction on the shaft 55 in view of the clutch arrangement provided by a plurality of balls or rollers 62 disposed in the tapered grooves 63 of the shaft, as illustrated in Fig. 2. The clutch arrangement prevents the rewinding of the cable upon the drum in a reverse direction. When the crank 57 is operated to wind the cable on the drum, the rollers or balls 62 then become effective for engaging the shaft to the gear 54 in driving relation. A cover plate 64 is secured over the gears 53 and 54 and retained in position by a plurality of screws 65. A threaded cap 66 is provided in the wall of the housing portion 11 in alignment with the shaft 28. The end of the shaft adjacent to the cap is provided with a recess 67 containing a spring 68 which is compressed by a round-headed pin 69 the head of which abuts an inner recess within the cap 66. The spring offers resistance to the movement of the shaft to the right when applying a braking force to the clutch plates through the operation of the drum, which force and resistance may be changed by employing springs of different tension or by the adjustment of the cap 66 through the wall.

A cable 71 has one end extending through an aperture 72 in the hub portion 73 of the drum and has an anchoring end 74 provided thereon for preventing the cable from being drawn through the aperture 72. A cable-holding arm 75 is secured within the housing on a pin 76 on one side of the cable delivery aperture 77. A guide pulley 78 is also mounted on the pin 76 between the side wall portion 79 of the arm 75 on a bearing sleeve 81 which may be secured to the pin or to the pulley. Within the aperture 77, a wiping ring 82 of bronze, felt or similar substance, is employed for cleaning the cable when it is being rewound upon the drum. The arm 75 has struck-out tongues 83 from the web portion 84 thereof for engaging one end of a spring 85, the opposite end of which is secured in position on a pin 86 which is frictionally secured within an aperture 87 centrally of the mating edges of the housing portions 10 and 11.

The outer end of the web 84 is formed into a cylindrical portion 88 the arc of which is greater than 180° so that it will retain a roller 89 therein. The roller extends between the walls of the cavity 15 of the drum 14 and is forced by the tension in the spring 85 against the cable on the drum to thereby retain the cable wound in a compact manner on the drum and prevent it from expanding thereon when no load is applied to the free end of the cable. An aperture 91 is provided through each of the housing portions 10 and 11, having a sleeve liner 92 of steel or similar hard metal press-fitted therein and formed at each end into a flange 93 to retain the sleeve against endwise movement. The supporting mechanism for the safety device is attached thereto by a clevis, the shaft portion of which extends through the sleeve 92.

The crank 57 has the end opposite to that containing the boss 61 bifurcated at 94 for receiving in the slot therein the end 95 of a crank handle 96. A slot 97 is provided in the end 95 which permits the handle to be moved outwardly of the crank arm 57 and rotated against the upper part of the casing to thereby reduce the overall width of the device when shipped or installed. After the cable has been unwound, it is only necessary to swing the handle down and move it inwardly against the crank arm to have it secured in position for operating the crank arm and rewinding the cable on the drum.

In operation, when it is desired to lower a weight or person by means of the safety device, it is only necessary to attach the harness to the device or person by the clevis (not shown) on the end of the cable 71, and when the load is freely suspended in air, the cable will start paying out at a predetermined rate of speed independent of the weight of the load. This is accomplished by the increased friction produced between the plates 35 and 36 by loads of greater weight. A greater lateral thrust is applied to the plates by the helical angle of the teeth of the gears 22 and 29 which, as pointed out above, is substantially 24°. It is to be understood that this particular angle proved satisfactory for the size of the device and gears herein employed and may vary substantially depending upon changes in size thereof and changes in the area of engagement of the plates, the number of which may be increased or decreased and the diameter of which may likewise be changed. For the number of plates herein illustrated, the teeth of substantially 24° helix angle proved the most desirable. A speed of 4 to 7 feet per second can be maintained by the described device for loads of from 50 to 300 pounds. The initial friction on the plates, gear train and pulley is such as to require a load of seven pounds to be applied on the cable before it can be pulled from the housing.

After the load has been lowered at a predetermined rate, as pointed out hereinabove, the cable is released from the harness and may be immediately rewound upon the drum 14 through the operation of the crank arm 57 by the crank handle 96. The overrunning clutch prevents the rewinding of the cable upon the drum in the wrong direction. When operating the crank arm to wind the cable in the right direction, the rollers or balls 62 will lock the shaft 55 to the gear 54 which will drive the gears 53 and 52 to thereby drive the gear 45 which tends to tighten the cap 42 on the threads of the annular flange 17 of the drum 14 to thereby rotate the drum in the proper direction for rewinding the cable. During the rewinding operation, the roller 89 extending within the cavity 15 of the drum will cause the cable to wind up in rows compactly so that all of the cable can be wound within the cavity and be retained in a compact position therein. During the rewinding operation, dirt or grime collected upon the cable will be wiped therefrom by the wiping sleeve 82 provided adjacent to the aperture 79 through which the cable extends. During the rewinding operation, the spring 68 will urge the shaft to the left, as viewed in Fig. 2, to thereby release any friction between the plates 35 and 36 so that the cable may be rewound with a minimum of effort. The safety device has proved successful in lowering loads of different weight at substantially constant speed so that the striking force at the end of the descent will be a permissible minimum amount which will not harm the load.

What is claimed is:

1. A safety device including, in combination, a housing, a drum in said housing having longitudinally extending cylindrical flanges, annular bearings within said housing engaged by said flanges which rotate thereon, an internal gear secured to said drum, a shaft extending centrally of said drum having a gear, a gear mating with said internal gear and said gear on the shaft in driving relation to each other, a plurality of clutch plates alternate ones of which are secured to the shaft and to the drum, and a cable mounted on said drum extending from said housing.

2. A safety device including, in combination, a housing, a drum in said housing having longitudinally extending cylindrical flanges, annular bearings within said housing engaged by said flanges which rotate thereon, an internal gear secured to said drum, a shaft extending centrally of said drum having a gear, a gear mating with said internal gear and said gear on the shaft in driving relation to each other, a plurality of clutch plates alternate ones of which are secured to the shaft and to the drum, and a cable mounted on said drum extending from said housing, the teeth of said gears being of the helical type and of a pitch disposed in a direction to apply a force longitudinally of the shaft toward said plates.

3. A safety device including, in combination, a housing, a drum in said housing having longitudinally extending cylindrical flanges, annular bearings within said housing engaged by said flanges which rotate thereon, an internal gear secured to said drum, a shaft extending centrally of said drum having a gear, a gear mating with said internal gear and said gear on the shaft in driving relation to each other, a plurality of clutch plates alternate ones of which are secured to the shaft and to the drum, a cable mounted on said drum extending from said housing, the teeth of said gears being of the helical type and of a pitch disposed in a direction to apply a force longitudinally of the shaft toward said plates, and a spring engaging the end of the shaft for applying a force longitudinally of the shaft in a direction opposite to that applied by the helical teeth of the gears.

4. A safety device including, in combination, a housing, a drum in said housing having longitudinally extending cylindrical flanges, annular bearings within said housing engaged by said flanges which rotate thereon, an internal gear secured to said drum, a shaft extending centrally of said drum having a gear, a gear mating with said internal gear and said gear on the shaft in driving relation to each other, a plurality of clutch plates alternate ones of which are secured to the shaft and to the drum, a cable mounted on said drum extending from said housing, the teeth of said gears being of the helical type and of a pitch disposed in a direction to apply a force longitudinally of the shaft toward said plates, a spring engaging the end of the shaft for applying a force longitudinally of the shaft in a direction opposite to that applied by the helical teeth of the gears, and a spring-pressed finger extending within the drum engaging said cable for controlling the winding thereof in rows when the cable is wound on the drum.

5. A safety device including, in combination, a housing, a drum in said housing having longitudinally extending cylindrical flanges, annular bearings within said housing engaged by said flanges which rotate thereon, an internal gear secured to said drum, a shaft extending centrally of said drum having a gear, a gear mating with said internal gear and said gear on the shaft in driving relation to each other, a plurality of clutch plates alternate ones of which are secured to the shaft and to the drum, a cable mounted on said drum extending from said housing, the teeth of said gears being of the helical type and of a pitch disposed in a direction to apply a force longitudinally of the shaft toward said plates, a spring engaging the end of the shaft for applying a force longitudinally of the shaft in a direction opposite to that applied by the helical teeth of the gears, a spring-pressed finger extending within the drum engaging said cable for controlling the winding thereof in rows when the cable is wound on the drum, a train of gears connected to said drum for operating the drum to rewind the cable, a shaft having a crank arm for operating said rewind mechanism manually, and an overrunning clutch in said gear train and shaft for preventing the operation of the drum thereby in a reverse direction.

6. In a safety device embodying a drum having a winding surface, said drum containing a cable and clutch mechanism for applying a resistance to the unwinding of the cable from the drum, a pulley over which said cable operates, a cable-guiding finger having a web and two side flanges the latter of which spans said pulley, a shaft extending through said two side flanges and pulley for supporting the finger and pulley on the housing, a spring for urging said finger toward the winding surface of the drum, and a roller supported on the end of the finger in engagement with the cable disposed on the drum winding surface.

7. In a safety device embodying a drum having a winding surface, said drum containing a cable and clutch mechanism for applying a resistance to the unwinding of the cable from the drum, a pulley over which said cable operates, a cable-guiding finger having a web and two side flanges the latter of which spans said pulley, a shaft extending through said two side flanges and pulley for supporting the finger and pulley on the housing, a spring for urging said finger toward the winding surface of the drum, a roller supported on the end of the finger in engagement with the cable disposed on the drum winding surface, a gear train for operating the drum for rewinding the cable thereon, a crank arm operating said gear train, and a handle on the end of the crank arm secured in a slot by a pivot disposed in a slot in the handle which permits the handle to be swung inwardly against the housing when not in use.

8. In a safety device embodying a drum having a winding surface, said drum containing a cable and clutch mechanism for applying a resistance to the unwinding of the cable from the drum, a pulley over which said cable operates, a cable-guiding finger having a web and two side flanges the latter of which spans said pulley, a shaft extending through said two side flanges and pulley for supporting the finger and pulley on the housing, a spring for urging said finger toward the winding surface of the drum, a roller supported on the end of the finger in engagement with the cable disposed on the drum winding surface, a gear train for operating the drum for rewinding the cable thereon, a crank arm operating said gear train, a handle on the end of the crank arm secured in a slot by a pivot disposed in a slot in the handle which permits the handle to be swung inwardly against the housing when not in use, and an overrunning clutch provided in said last gear train and said crank arm.

9. A safety device comprising a housing made of two similar castings providing when secured together a hollow interior, a pair of ring bearings secured in said housing one secured in each of said castings, a drum within said housing having a central cable-receiving cavity from the walls of which two annular flanges extend in operating engagement with the bearings, an internal gear secured to the drum, a shaft journaled in said housing centrally of the drum and supported for endwise movement, a gear on said shaft, a gear in engagement with said last gear and with said internal gear, the teeth of said gears being of helical form capable of producing through the gear on the shaft an end thrust on said shaft, a pressure plate secured to said shaft, and clutch plates, alternate plates being secured to the shaft and to the drum, said clutch plates providing a variable resistance against the operating of the drum by the endwise movement of the pressure plate and shaft, a greater load being lowered producing a greater end thrust on the shaft.

10. A safety device comprising a housing made of two similar castings providing when secured together a hollow interior, a pair of ring bearings secured in said housing one secured in each of said castings, a drum within said housing having a central cable-receiving cavity from the walls of which two annular flanges extend in operating engagement with the bearings, an internal gear secured to the drum, a shaft journaled in said housing centrally of the drum and supported for endwise movement, a gear on said shaft, a gear in engagement with said last gear and with said internal gear, the teeth of said gears being of helical form capable of producing through the gear on the shaft an end thrust on said shaft, a pressure plate secured to said shaft, and clutch plates, alternate plates being secured to the shaft and to the drum, said clutch plates providing a variable resistance against the operating of the drum by the endwise movement of the pressure plate and shaft, a greater load being lowered producing a greater end thrust on the shaft, at least one set of said plates having bearing surfaces.

11. A safety device comprising a housing made of two similar castings providing when secured together a hollow interior, a pair of ring bearings secured in said housing one secured in each of said castings, a drum within said housing having a central cable-receiving cavity from the walls of which two annular flanges extend in operating engagement with the bearings, an internal gear secured to the drum, a shaft journaled in said housing centrally of the drum and supported for endwise movement, a gear on said shaft, a gear in engagement with said last gear and with said internal gear, the teeth of said gears being of helical form capable of producing through the gear on the shaft an end thrust on said shaft, a pressure plate secured to said shaft, and clutch plates, alternate plates being secured to the shaft and to the drum, said clutch plates providing a variable resistance against the operating of the drum by the endwise movement of the pressure plate and shaft, a greater load being lowered producing a greater end thrust on the shaft, one set of said plates having a core of nonbearing material provided with surfaces of bearing material.

12. A safety device for lowering a load including, in combination, a housing, a drum in said housing having a central reel cavity, bearings within the housing for rotatably supporting said drum, a clutch element made up of a plurality of plates alternate ones of which are connected to said drum, a shaft journaled in said housing and connected to the other of said plates, a pressure plate fixed to said shaft, and gear means connecting said shaft to said drum the teeth of which are of helical form disposed in a manner to produce an end thrust on said shaft and pressure plate toward said clutch plate for applying a variable pressure therebetween.

13. A safety device for lowering a load including, in combination, a housing, a drum in said housing having a central reel cavity, bearings within the housing for rotatably supporting said drum, a clutch element made up of a plurality of plates alternate ones of which are connected to said drum, a shaft connected to the other of said plates, gear means connecting said shaft to said drum the teeth of which are of helical form disposed in a manner to produce an end thrust on said shaft toward said plates for applying a variable pressure therebetween, and a cable in the cavity of said drum for attachment to a load to be lowered, the speed of rotation of the drum as the cable is unwound being controlled by the amount of braking force produced on the plates by the end thrust applied by the shaft which increases with the increase in weight of the load being lowered.

14. A safety device for lowering a load including, in combination, a housing, a drum in said housing having a central reel cavity, bearings within the housing for rotatably supporting said drum, a clutch element made up of a plurality of plates alternate ones of which are connected to said drum, a shaft connected to the other of said plates, gear means connecting said shaft to said drum the teeth of which are of helical form disposed in a manner to produce an end thrust on said shaft toward said plates for applying a variable pressure therebetween, and a cable in the cavity of said drum for attachment to a load to be lowered, the speed of rotation of the drum as the cable is unwound being controlled by the amount of braking force produced on the plates by the end thrust applied by the shaft which increases with the increase in weight of the load being lowered, one set of said plates having surfaces of bearing material which prevents scoring of the plates when rotated under load.

15. A safety device for lowering a load including, in combination, a housing, a drum in said housing having a central reel cavity, bearings within the housing for rotatably supporting said drum, a clutch element made up of a plurality of plates alternate ones of which are connected to said drum, a shaft connected to the other of said plates, gear means connecting said shaft to said drum the teeth of which are of helical form disposed in a manner to produce an end thrust on said shaft toward said plates for applying a variable pressure therebetween, and a cable in the cavity of said drum for attachment to a load to be lowered, the speed of rotation of the drum as the cable is unwound being controlled by the amount of braking force produced on the plates by the end thrust applied by the shaft which increases with the increase in weight of the load being lowered, one set of said plates having surfaces of bearing material which prevents scoring of the plates when rotated under load, said bearing material being lubricant-absorbing metal applied to a central core of sheet material.

16. A safety device for lowering a load including, in combination, a housing, a drum in said housing having a central reel cavity, bearings within the housing for rotatably supporting said drum, a clutch element made up of a plurality of plates alternate ones of which are connected to said drum, a shaft connected to the other of said plates, gear means connecting said shaft to said drum the teeth of which are of helical form disposed in a manner to produce an end thrust on said shaft toward said plates for applying a variable pressure therebetween, a cable in the cavity of said drum for attachment to a load to be lowered, the speed of rotation of the drum as the cable is unwound being controlled by the amount of braking force produced on the plates by the end thrust applied by the shaft which increases with the increase in weight of the load being lowered, and a train of gears connected to said drum and to a crank for rewinding said cable in the cavity of said drum.

17. A safety device for lowering a load including, in combination, a housing, a drum in said housing having a central reel cavity, bearings within the housing for rotatably supporting said drum, a clutch element made up of a plurality of plates alternate ones of which are connected to said drum, a shaft connected to the other of said plates, gear means connecting said shaft to said drum the teeth of which are of helical form disposed in a manner to produce an end thrust on said shaft toward said plates for applying a variable pressure therebetween, a cable in the cavity of said drum for attachment to a load to be lowered, the speed of rotation of the drum as the cable is unwound being controlled by the amount of braking force produced on the plates by the end thrust applied by the shaft which increases with the increase in weight of the load being lowered, and a train of gears connected to said drum and to a crank for rewinding said cable in the cavity of said drum, said train of gears and crank having an overrunning clutch therein which renders the crank inoperative for winding the cable on the drum in a reverse direction.

18. A safety device for lowering a load including, in combination, a housing, a drum in said housing having a central reel cavity, bearings within the housing for rotatably supporting said drum, a clutch element made up of a plurality of plates alternate ones of which are connected to said drum, a shaft connected to the other of said plates, gear means connecting said shaft to said drum the teeth of which are of helical form disposed in a manner to produce an end thrust on said shaft toward said plates for applying a variable pressure therebetween, a cable in the cavity of said drum for attachment to a load to be lowered, the speed of rotation of the drum as the cable is unwound being controlled by the amount of braking force produced on the plates by the end thrust applied by the shaft which increases with the increase in weight of the load being lowered, and a spring-pressed finger extending into said cavity in engagement with said cable.

19. A safety device for lowering a load including, in combination, a housing, a drum in said housing having a central reel cavity, bearings within the housing for rotatably supporting said drum, a clutch element made up of a plurality of plates alternate ones of which are connected to said drum, a shaft connected to the other of said plates, gear means connecting said shaft to said drum the teeth of which are of helical form disposed in a manner to produce an end thrust on said shaft toward said plates for applying a variable pressure therebetween, a cable in the cavity of said drum for attachment to a load to be lowered, the speed of rotation of the drum as the cable is unwound being controlled by the amount of braking force produced on the plates by the end thrust applied by the shaft which increases with the increase in weight of the load being lowered, a spring-pressed finger extending into said cavity in engagement with said cable, a shaft on which said finger is pivotally mounted, and a pulley on said shaft over which said cable is guided when being wound or unwound relative to said drum.

WILLIAM F. KLEMM.

References Cited in the file of this patent

UNITED STATES PATENTS

| Number | Name | Date |
|---|---|---|
| 918,451 | Johnson | Apr. 13, 1909 |
| 1,021,347 | Windhoff | Mar. 26, 1912 |
| 1,273,747 | Davidoff | July 23, 1918 |
| 1,406,570 | Mace | Feb. 14, 1922 |
| 2,402,756 | Lawler | June 25, 1946 |